Nov. 10, 1964 C. L. BROWN 3,156,097

HYDRAULIC MASTER CYLINDER

Filed March 29, 1963 2 Sheets-Sheet 1

INVENTOR.
CURTIS L. BROWN
BY Irvin L. Groh
ATTORNEY.

INVENTOR.
CURTIS L. BROWN
BY Irvin L. Groh
ATTORNEY.

3,156,097

HYDRAULIC MASTER CYLINDER

Curtis L. Brown, Owosso, Mich., assignor to Midland-Ross Corporation, Cleveland, Ohio, a corporation of Ohio Filed Mar. 29, 1963, Ser. No. 268,876
4 Claims. (Cl. 60—54.6)

This invention relates to hydraulic brakes and, more particularly, to fabricated master cylinders of the compensating type which are used for hydraulic brake systems on vehicles.

Conventional master cylinders in use for vehicle brake systems usually incorporate a cylinder and reservoir cast together as a unit and a piston which reciprocates in the cylinder. The head of the piston is provided with a packing which, in the retracted position of the piston, exposes a compensating port. The reservoir and the power chamber of the cylinder communicate with each other through the port to maintain a constant volume of hydraulic fluid in the cylinder for the purpose of compensating for any expansion and contraction of the fluid due to temperature variations, or to replenish fluid that may be lost due to evaporation or minor leaks in the hydraulic system.

Conventional master cylinders have many deficiencies and great effort and expense have been incurred in attempts to overcome these defects. Normally the reservoir and cylinder are cast integrally and machining is required to finish the bore of the cylinder and various drilling operations are required to provide the ports for placing the cylinder and reservoir in communication with each other. Unfortunately, such castings are subject to porosity which results in pits in the cylinder bore that cause wear of the critical seals associated with the moving piston. Furthermore, it is difficult to provide a cylinder bore of desired hardness and wear characteristics.

Another problem associated with conventional master cylinders which further aggravates wear of the sealing portions associated with the moving piston is the location and arrangement of the compensating port over which the piston must pass. This problem alone had led to many attempted solutions in which the compensating port has been relocated, special valves have been used, and liners of special material have been used in the cylinder, all with a resulting increase in cost and without appreciably reducing the problems.

It is a general object of the invention to provide a master cylinder in which the portions of the assembly subjected to normal atmospheric pressures are made of an economical, soft material such as plastic, and portions subjected to high hydraulic pressures and to wear between relatively moving parts are made of a harder material.

Another important object of the invention is to provide a master cylinder of the above-mentional type in which the conventional compensating port is eliminated and the juncture of the components which is formed of the two different materials affords a compensating means which completely eliminates wear associated with conventional compensating ports.

Another object of the invention is to provide a master cylinder having a compensating means that permits free fluid flow and eliminates wear of parts associated with conventional compensating means.

It is also an object of the invention to provide a master cylinder having compensating means which makes it possible to greatly vary the normal position of the master cylinder relative to the vehicle without impairing its operation.

An additional object of the invention is to provide a master cylinder fabricated of two parts and so arranged that the joint between the two parts is subject to low, atmospheric pressures, thereby eliminating the need of separate fluid pressure seals.

Still another object of the invention is to provide an inexpensive, simple master cylinder in which the part subject to the greatest wear may be readily replaced.

These and other objects of the invention will be readily apparent from the description and from the drawings in which.

Figure 1:
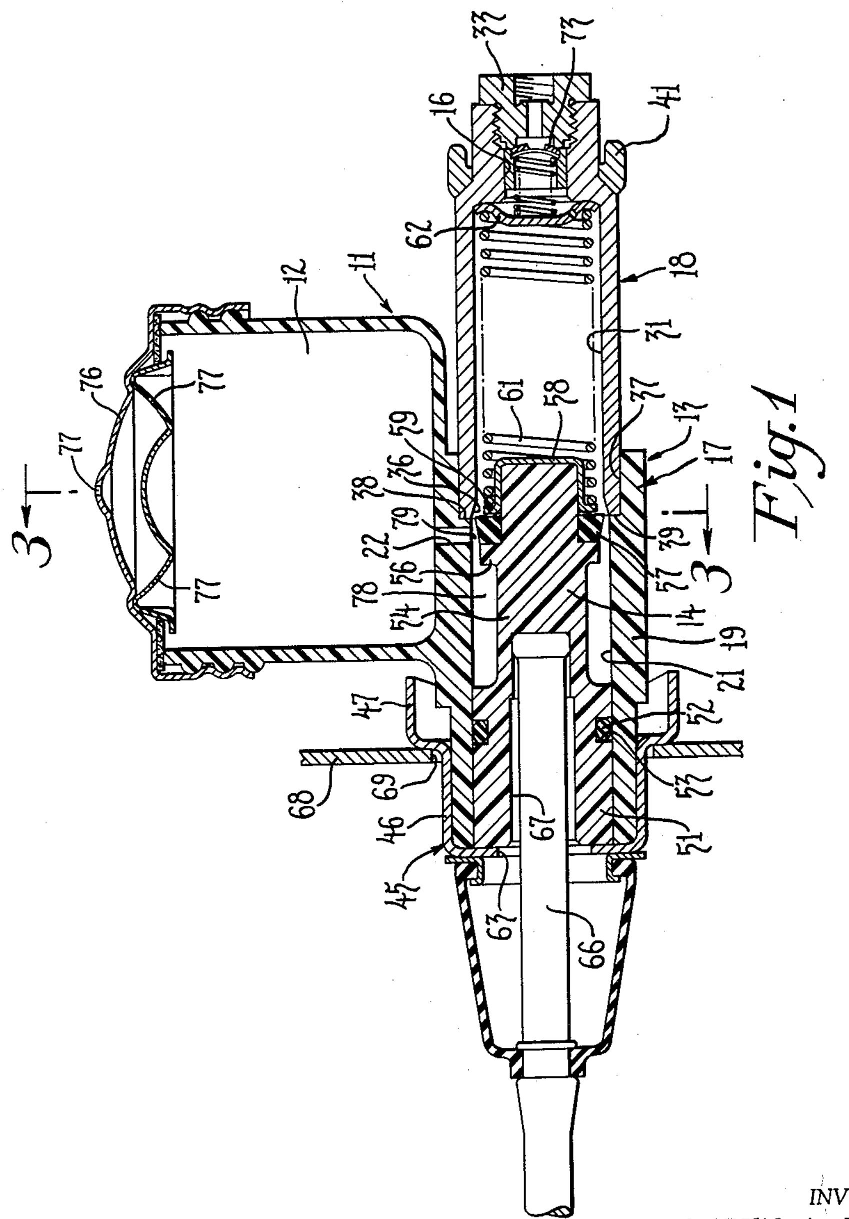
FIGURE 1 is a longitudinally sectional view of a master cylinder embodying the invention.

Referring to the drawings and particularly to FIGURE 1, the master cylinder assembly 11 embodying the invention, like many conventional master cylinders, includes a reservoir 12, a cylinder 13, and a piston 14 which is disposed in the cylinder 13 and is moved from the position shown in the drawing toward the right to increase the pressure of hydraulic fluid and transmit it through an outlet passage 16 to a hydraulic system such as a vehicle brake system (not shown).

More specifically, the master cylinder assembly 11 includes a main body portion 17 and a tube member 18. The main body portion 17 includes the reservoir 12 which is formed integrally with a cylinder housing 19. The cylinder housing 19 is provided with a bore 21 of uniform diameter throughout its axial length. A relatively large port 22 is formed radially and adjacent one end of the bore 21 to place the reservoir 12 and the bore in constant communication with each other.

The main body member may be molded of plastic material, for example, by injection molding. This results in a completely finished part so that no further operations are required to form the bore 21 and the port 22.

The tube member 18 of the master cylinder assembly 11 is provided with a bore 31. One end of the bore 31 communicates with the outlet passage 16 which is internally threaded to receive a fitting 33. The fitting 33 in turn is adapted to be connected in conventional manner to hydraulic lines (not shown) for the purpose of transmitting pressure of the hydraulic fluid from the master cylinder assembly 11 to the remainder of the hydraulic system. The other end of the tube member 18 is provided with a portion 36 which tapers from the smaller internal diameter of the bore 31 to the larger diameter of the bore 21. Preferably, the larger portion of the tapered portion 36 is at least equal to the diameter of the bore 21.

Figure 2:
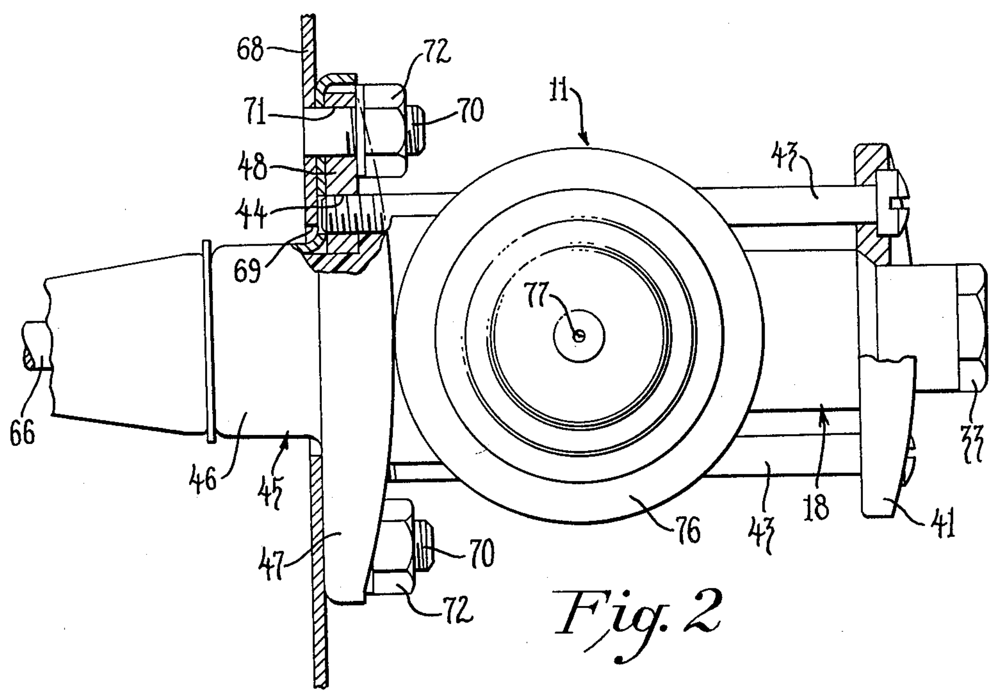
FIGURE 2 is a top view of the master cylinder assembly with parts broken away and partially shown in section.
Figure 3:
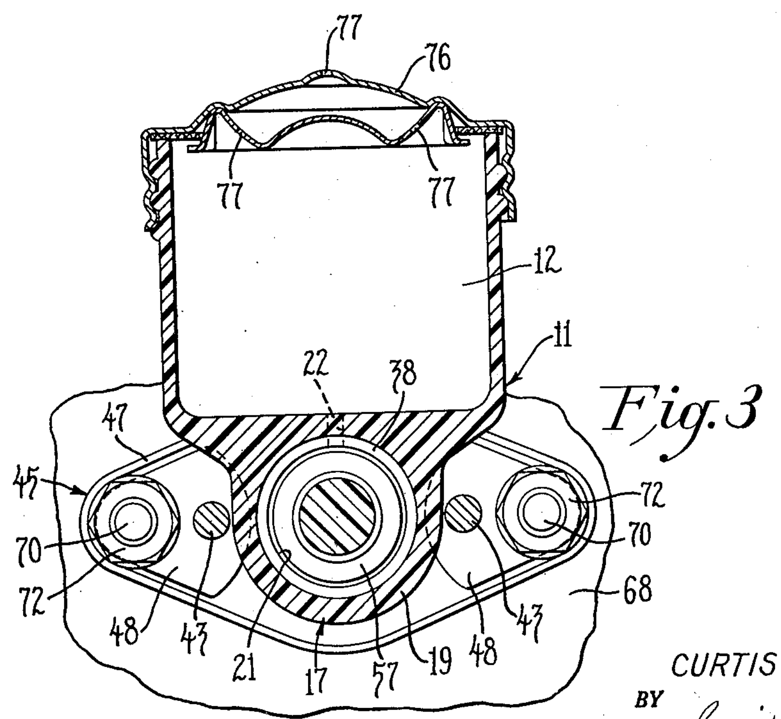
FIGURE 3 is a cross-sectional view of the master cylinder taken on line 33 in FIGURE 1.

The main body member 17 and the tube portion 18 are joined together by means of a socket 37 formed in the main body 17 and having an internal diameter larger than the bore 21 and substantially equal to the outside diameter of the tube member 18. The point at which the bore 21 meets the socket 37 affords a shoulder 38 which engages the annular end portion 39 of the tube member. As shown in FIGURE 2, the tube member 18 also includes an integral flange 41 which is provided with holes to receive tie bolts 43. The threaded ends of the tie bolts engage threaded holes 44 in an adapter assembly 45. The adapter assembly includes a sheet metal part having a cup-shaped portion 46 which merges with a generally oblong flange portion 47. Steel fasteners 48 which includes the threaded holes 44 are welded to the flange portion 47. During assembly, the cup portion 46 is placed over the end of the cylinder housing 19 and tie bolts 43 are tightened to press the tube portion 18 into socket 37 of the main body portion 17 so that the bores 21 and 31 are in axial alignment with each other.

Preferably, the tube member 18 may be made of extruded metal such as an aluminum alloy. When extruded, such materials result in a part having finely finished surfaces so that additional operations are not required to complete the bore 31 and the tapered portion 36.

The piston 14 which is supported for movement in the cylinder 13 also may be made of plastic material and includes a barrel portion 51 having a sliding fit with the bore 21. An O-ring seal is seated in a groove 53 formed in the barrel portion 51 to prevent leakage of hydraulic fluid from the bore 21. A stem 54 extends forwardly from the barrel portion 51 and an intermediate portion is provided with an annular flange 56 which acts to form a piston head. The flange 56 is of a lesser diameter than either the bore 21 or the bore 31, and the barrel portion 51 has a substantial axial length in engagement with the walls of the bore 21 to pilot the flange 56 and maintain it centered in spaced relation to the walls of the bore 31. Upon movement of the piston 14 to the right from the retracted position shown in FIGURE 1, the flange 56 freely enters the bore 31 without interference.

A seal 57, preferably of material having some resiliency, is positioned on the stem 54 to one side of the flange 56. The seal 57 has an outer diameter slightly greater than the internal diameter of bore 31 but smaller than the internal diameter of bore 21. The seal is held in position by a cup-shaped retainer 58 which fits over the end of the stem 54. The retainer 58 is formed with an annular flange 59, which together with the flange 56, forms a groove holding the seal 57 in position.

A compression spring 61 is biased between the flange 59 on the retainer 58 and a spring seat 62 fitted in one end of the bore 31. The spring 61 acts to hold the retainer 58 in position on the stem 54 and continuously biases the piston 14 toward its retracted position which is determined by engagement with the bottom of the cup portion 46.

The piston 14 is moved from its retracted position by a push rod 66 which passes through an enlarged opening 63 in the cup portion 46 and is seated in an elongated hole 67 in the piston 14. The push rod may be a portion of a conventional brake pedal linkage or servomotor, neither of which is shown. By applying either manual or powered effort to the push rod 66, the piston 14 may be moved from the retracted position shown in FIGURE 1 toward the right to increase the pressure of hydraulic fluid in bore 31 and transmit the pressure through the usual residual check valve 73 and outlet passage 16 to the hydraulic system.

The entire master cylinder assembly 11 is supported on the firewall 68 of a vehicle to receive the push rod 66 by placing the cup portion 46 of the adapter assembly 45 into an opening 69 so that the flange portion 47 engages the firewall. In this position, studs 70 welded to the firewall pass through openings 71 formed in the fasteners 48 and receive nuts 72 to detachably secure the master cylinder assembly in position.

The reservoir 12 is covered with a screw-type cap 76 which is provided with breather holes 77 by which the reservoir 12 remains in constant communication with the atmosphere.

In normal operation, hydraulic fluid occupies a substantial portion of the reservoir 12 and completely fills the bores 21 and 31. The various parts of the master cylinder assembly 11 occupy an initial position shown in FIGURE 1. Under these conditions, hydraulic fluid at atmospheric pressure occupies the reservoir 12 and the chamber 78 formed around the stem 54 in the bore 21. The chamber 78 freely communicates with the chamber to the right of the piston 14 in the bore 31 by way of the annular passage 79 formed between the seal 57 and the cylinder housing 19. As long as hydraulic fluid is maintained in the reservoir 12, the chamber 78 and the bore 31 will be completely occupied with hydraulic fluid.

When the master cylinder is actuated by way of a force applied to the push rod 66, the piston 14 is moved to the right as viewed in FIGURE 1. Slight initial movement causes the lip formed by the outer diameter of the seal 57 to engage the tapered portion 36, at which time the bore 31 is isolated from the chamber 78 and the reservoir 12. Subsequent movement of the piston 14 causes the flexible seal 57 to be gradually contracted until it enters the bore 31. Continued movement of the piston 14 to the right increases the pressure of the hydraulic fluid which is transmitted to the hydraulic system. It will be noted that the increase in pressure starts at the time that the lip of seal 57 engages the tapered portion 36. As a consequence of the operation of the seal 57, the increase in hydraulic pressure occurs only in the tube portion 18.

As the piston 14 moves to the right, the chamber 68 remains in continuous communication with the reservoir 12 by way of the port 22. As a consequence, all of the master cylinder assembly disposed to the left of the seal 57 remains immersed in hydraulic fluid at a low, atmospheric pressure. Since the hydraulic fluid remains at atmospheric pressure, problems of fluid leakage around the seal 52 are minimized. Of even greater importance is that the point of contact between the shoulder 38 and the end portion 39 of the tube member 18 is continuously subjected to hydraulic fluid at low pressure and never to the high pressure developed in the bore 31. Because of this, the main body 17 and the tube member 18 may be joined together without using additional seals or gaskets to prevent fluid leakage.

After the master cylinder assembly has been actuated and manual effort is released from the push rod 66, the high pressure of the hydraulic fluid in the bore 31 and the spring 61 act on the piston 14 to return it to the right to its original retracted position.

It will be noted that the usual compensating port is completely eliminated and that the flow of hydraulic fluid to compensate for changes in the volume of hydraulic fluid in the bore 31 takes place through the annular passage formed between the seal 57 and the walls of the bore 21. Furthermore, at no time during the piston stroke does the outer diameter of the seal 57 engage any obstructions which would cause scuffing and wear of the type that would occur upon engagement with a radially disposed compensating port. In addition, the annular passage permits a freer flow of fluid between the bore 31 and the reservoir 12 than could be achieved through a conventional compensating port.

Since the reservoir 12 communicates solely with the bore 21 and the latter communicates with the bore 31, the annular compensating passage has the further advantage, upon depletion of fluid in the reservoir 12, of permitting the hydraulic fluid that might remain in chamber 78 to enter the bore 31 to supply some hydraulic pressure to the associated braking system.

If necessary, the tubular member 18 can be replaced without replacement of the remaining components of the master cylinder assembly. The inside diameter of the bore 31 is smaller than the bore 21 so there is no great need to exercise excessive care in maintaining axial alignment of the bores 21 and 31 during assembly or repair of the components.

A fabricated master cylinder has been disclosed in which those portions where wear is critical and pressures are high is capable of being made in one part of a hard, finely finished material, and those portions where wear is not critical and only low pressures are encountered may be incorporated in a part made of economical, easily formed material such as plastic. Furthermore, the two parts made of the two different materials are joined together in such a manner that the joint between them is subject only to low pressure and does not require seals or gaskets. In addition, the joint between the two parts is so constructed and arranged that a compensating passage is afforded for hydraulic fluid which eliminates seal wear and other detrimental characteristics associated with conventional compensating ports.

It should be understood that it is not intended to limit the invention to the above described forms and details and that the invention includes other forms and modifications that are embraced by the scope of the appended claims.

It is claimed and desired to secure by Letters Patent:

1. A master cylinder structure for use in hydraulic brake systems comprising a reservoir of hydraulic fluid in constant communication with the atmosphere, a cylinder body formed integrally with said reservoir and having a first cylinder bore therein, a port between said reservoir and first cylinder bore maintaining constant communication therebetween, a piston member including a piston head disposed in said cylinder bore, a tube member connected to said cylinder body and having a second cylinder bore in axial alignment with said first cylinder bore, said piston head being engageable with said second cylinder bore and being smaller than said first cylinder bore, said piston head having an initial position in said first cylinder bore between said port and one end of said first cylinder bore to provide an annular passage surrounding said piston head, said annular passage placing said first and second bores in communication with each other, said piston member being movable between said initial position and an applied position in which said piston head engages said second bore to close said annular passage and isolate said bores.

2. A master cylinder for a hydraulic brake system, an elongated cylinder having first and second bores in axial alignment with each other and with said first bore being of a larger diameter than said second bore, a tapered portion increasing in diameter from the diameter of said second bore to the diameter of said first bore, means for supplying hydraulic fluid at atmospheric pressure to said cylinder and communicating solely with said first bore, a piston having a retracted position in said first bore and including a barrel part slidably engaging said first bore, a piston head including a resilient seal connected to said barrel part for movement therewith and having a diameter smaller than said first bore and slightly larger than said second bore, said seal being disposed in spaced relation to said tapered portion and said first bore to afford an annular passage for hydraulic fluid between said first and second bores when said piston is in retracted position, said piston being movable from said retracted position to initially engage said tapered portion and isolate said first and second bores from each other and subsequently to engage said second bore for increasing hydraulic pressure therein.

3. A master cylinder structure for use in hydraulic brake systems comprising a main body member including a reservoir and a cylinder body formed integrally with each other, an elongated bore formed in said cylinder body, a passage between said reservoir and said bore, a tube member having an internal diameter smaller than the internal diameter of said bore, one end of said member having an outlet and the other end having a tapered portion gradually increasing in diameter from the internal diameter of said tube member to said cylinder bore, one end of said bore forming a socket for receiving said tube member, means rigidly holding said tube member in said socket, a piston, an annular seal mounted on said piston for movement therewith, said seal having an outer diameter smaller than the internal diameter of said cylinder bore and larger than the internal diameter of said tube member, said piston having a retracted position in which said seal is spaced from the walls of said bore and is disposed between said passage and said tapered portion to permit fluid at atmospheric pressure to communicate between said bore and tube, said piston being movable through a position in which said seal engages said tapered portion and isolates said bore and tube from each other to a position in which said seal engages the internal walls of said tube to increase the pressure of hydraulic fluid therein.

4. A master cylinder for a hydraulic brake system comprising a main body member including a reservoir and cylinder body formed integrally with each other, said cylinder body having a stepped bore forming a cylinder bore portion and a socket portion, a passage between said reservoir and said cylinder bore, a tube member having an internal diameter smaller than the diameter of said cylinder bore, one end of said tube member being disposed in said socket member, means detachably holding said body and tube members together with the latter in axial alignment with said cylinder bore, a piston including a head smaller than said bore and engageable with the inner wall of said tube member, said piston having a retracted position in said cylinder bore in which said head is spaced from said cylinder bore at one end of the latter to afford an annular passage for fluid communication between said cylinder bore and tube member, and means for moving said piston from said retracted position toward an applied position in which said head engages the inner walls of said tube member to isolate the latter from said cylinder bore.

References Cited in the file of this patent

UNITED STATES PATENTS

| | | |
|---|---|---|
| 2,124,762 | Carroll | July 26, 1938 |
| 2,152,350 | Gardner | Mar. 28, 1939 |
| 2,377,017 | Lacoe | May 29, 1945 |
| 2,561,009 | Byers et al. | July 17, 1951 |
| 2,615,304 | Groves | Oct. 28, 1952 |

FOREIGN PATENTS

| | | |
|---|---|---|
| 853,565 | Germany | Oct. 27, 1952 |